United States Patent [19]

Arens

[11] Patent Number: 5,267,497

[45] Date of Patent: Dec. 7, 1993

[54] DUAL ACTION PUNCH FOR USE IN A RECIPROCATING OPERATION CAPABLE OF SCARFING AND PIERCING MATERIAL

[76] Inventor: Cornelius G. Arens, 6011 Danberry Ct., West Bloomfield, Mich. 48322

[21] Appl. No.: 770,421

[22] Filed: Oct. 3, 1991

[51] Int. Cl.⁵ ............................................. B26D 3/10
[52] U.S. Cl. ........................................ 83/555; 83/39; 83/54; 83/588; 83/601
[58] Field of Search .................... 83/555, 39, 554, 54, 83/588, 597, 601

[56] References Cited

U.S. PATENT DOCUMENTS

| | | | |
|---|---|---|---|
| 4,015,496 | 4/1977 | Hill | 83/555 X |
| 4,951,538 | 8/1990 | Borzym | 83/555 X |
| 5,038,477 | 8/1991 | Parrow | 83/607 X |

Primary Examiner—Douglas D. Watts
Assistant Examiner—Kenneth E. Peterson

[57] ABSTRACT

A dual action punch having two portions capable of performing scarfing and piercing respectively. The scarfing operation is accomplished by moving the punch in a direction tangential to the surface of the material so as to engage portions of the material which may extend from the major plane thereof, such as flanges. As the punch passes through a respective die opening formed in the lower die, the engaged portions of the flange are removed and the scarfing operation is complete. In this manner an opening is produced in the flange which corresponds to the shape and location of the punch as it is moved in the tangential direction. The piercing operation is accomplished by moving the punch in a direction orthogonal to a major plane of the material. As the punch passes through a respective die opening formed in the lower die, an opening is formed in the material which corresponds to the shape and location of the punch as it is moved in the orthogonal direction. The scarfing and piercing operation may be one continuous motion or each operation may be accomplished individually by modifying the stroke of the reciprocating press and/or the mechanism which generates the tangential and orthogonal motion of the punch.

3 Claims, 10 Drawing Sheets

DUAL ACTION PUNCH FOR USE IN A RECIPROCATING OPERATION CAPABLE OF SCARFING AND PIERCING MATERIAL

BACKGROUND OF THE INVENTION

1. Field of the Invention

This invention relates to punches used in reciprocating presses and, more particularly, to punches capable of multiple functions including scarfing and piercing.

2. Description of the Prior Art

Punches used in reciprocating presses are known in the art for piercing openings in materials. The pierced openings may be positioned and shaped by selection of punch cross-section and location with respect to the material. In most instances, the material to be pierced is flat and lays nested in a lower die section of the reciprocating press. The punch is carried in an upper die section and reciprocated thereby upon cycling of the press. Attempts to create openings in flanges or ribbed portions of the material which extend beyond the general plane thereof which may not be nested against a lower die section result in distortions of the material surrounding the opening. In the context of producing openings in vinyl siding this situation is manifested as follows; when installed on the periphery of a building vertically sequential siding members are interlocked to provide a continuous barrier by cooperating flanges. That is, one flange protrudes outwardly from the plane of a first siding member while another flange protrudes inwardly from the plane of a second siding member for respective cooperating engagement therebetween. In a typical siding system, the outwardly protruding flange is located on the top of a siding member and formed as a loop whereas the inwardly protruding member is located on the bottom and formed as a J. In this manner vertically sequential siding members are engaged with one another by cooperating top and bottom flanges. Horizontally abutting siding members must overlap and thereby nest with one another at end portions thereof. Overlapping of end portions is facilitated by trimming and/or notching the top and bottom flanges. Such trimming and/or notching may be performed at the same time the sections are cut to length. That is, a reciprocating press shears a continuously formed structure into individual siding members with a single reciprocating blade and at the same time, the end portions of the top flanges are removed with a two stage shearing operation. The first stage of the shearing operation removes a square portion of the flange leaving a half section of the loop which extends out over a portion of the siding member. The second stage of the shearing operation removes the half section of the loop. The first and second stage shearing operations are performed by shearing blades carried by a common reciprocating member. The first stage of the shearing operation is performed by a blade which is received within a cooperating opening in the lower die. The edge of the opening in the lower die functions as a blade to effect shearing of the siding member therealong. In addition, the opening provides a conduit for scrap conveyance. The second stage shearing operation is performed by a reciprocating blade which is advanced in a manner so as to cut through the loop portion of the top flange and stop immediately prior to contacting the surface of the siding member. As there is no die opening for the half section of the loop to exit the cutting operation, it becomes a nuisance. It may become engaged with moving portions of the equipment resulting in inference therewith. In addition, it it is conveyed with a siding member into a packaging container, it may be concealed within stacks thereof and produce an impression in the respectively engaged siding surfaces resulting in the necessity to scrap the respectively impressed siding members. Therefore, there is a need for a shearing operation which successfully conveys scrap into known collection points as well as pierces openings without distorting the adjacent material.

SUMMARY OF THE PRESENT INVENTION

The present invention includes a dual action punch having two distinct portions capable of performing scarfing and piercing respectively. The scarfing operation is accomplished by moving the punch in a direction substantially tangential to the surface of the material so as to engage portions of the material which may extend from the major plane thereof, such as flanges. When the punch passes through a respective die opening formed in the lower die, the engaged portions of the flange are removed and the scarfing operation is completed. In this manner an opening is produced in the flange which corresponds to the shape and location of the punch as it is moved in the tangential direction. The piercing operation is accomplished by moving the punch in a direction substantially orthogonal to a major plane of the material. As the punch passes through a respective die opening formed in the lower die, an opening is formed in the material which corresponds to the shape and location of the punch as it is moved in the orthogonal direction. The scarfing and piercing operation may be one continuous motion or each operation may be accomplished individually by modifying the stroke of the reciprocating press and/or the mechanism which generates the tangential and orthogonal motion of the punch.

These and other aspects of the present invention will become more readily apparent by reference to the following detailed description of the embodiments as shown in the drawings.

DETAILED DESCRIPTION OF THE PREFERRED EMBODIMENT

Figure 1:
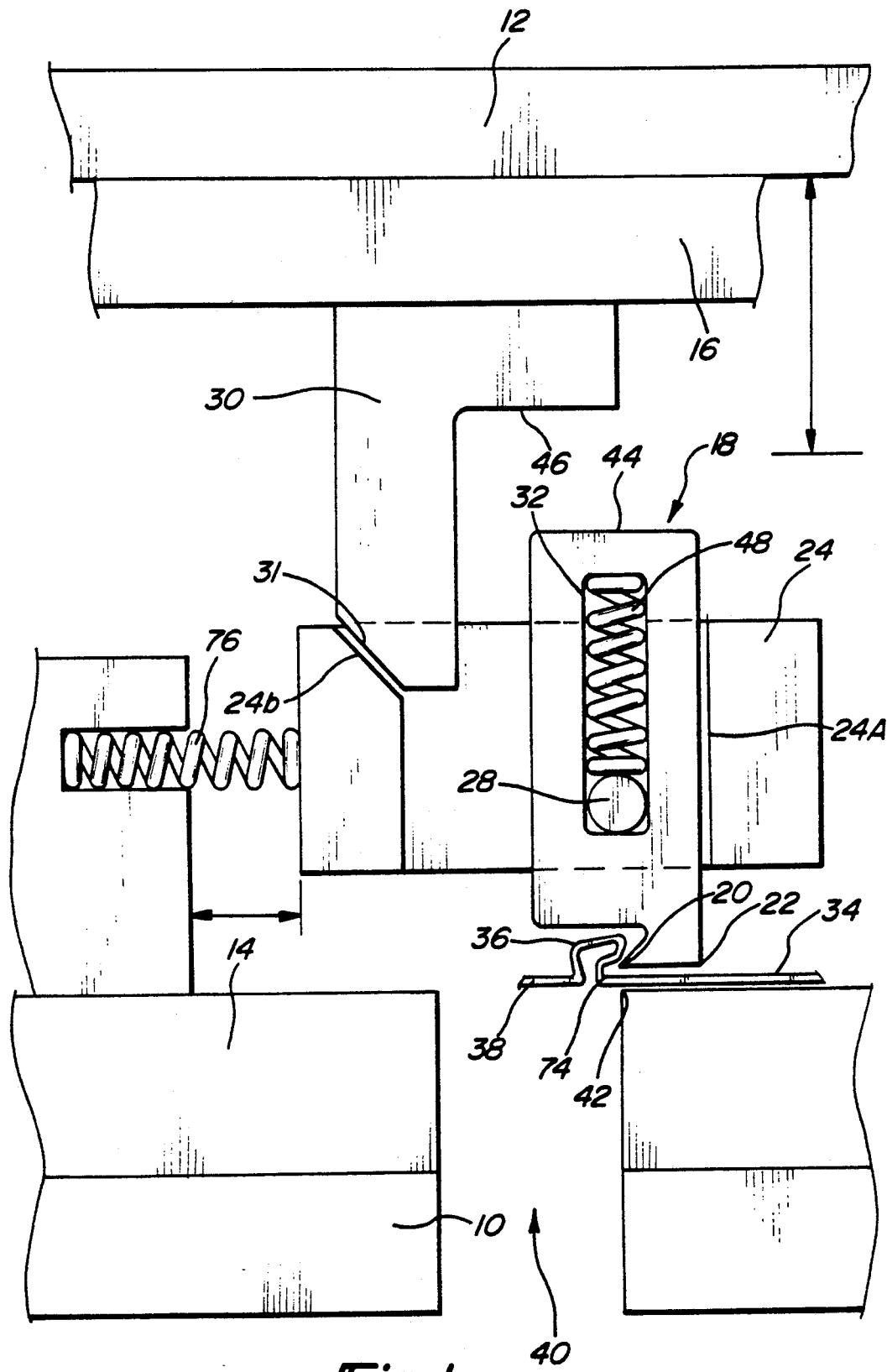
FIG. 1 is an end view of the die of the present invention showing the punch in retracted position.
Figure 2:
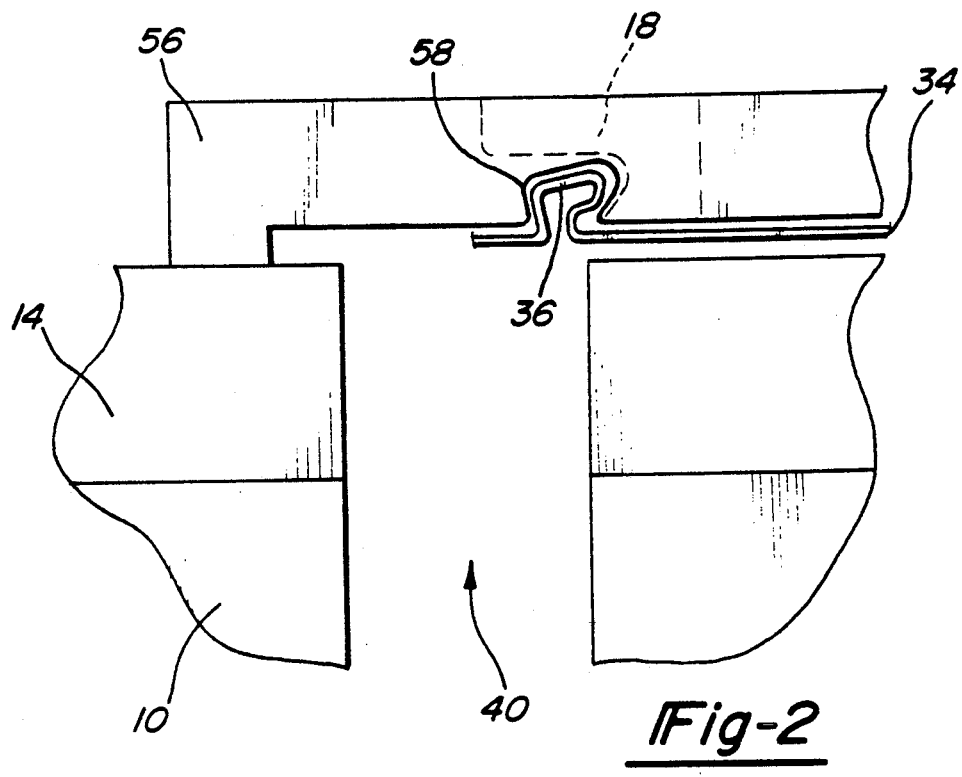
FIG. 2 is an end view of the lower die portion of the present invention showing the guide.
Figure 3:
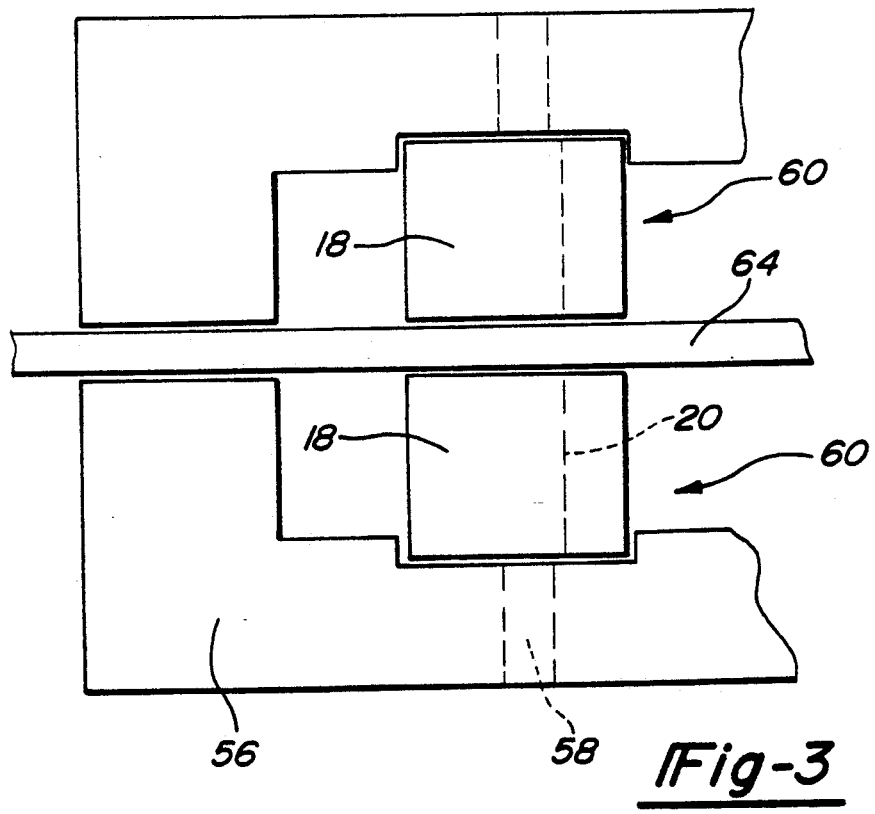
FIG. 3 is a top view of the guide of the lower die portion.
Figure 4:
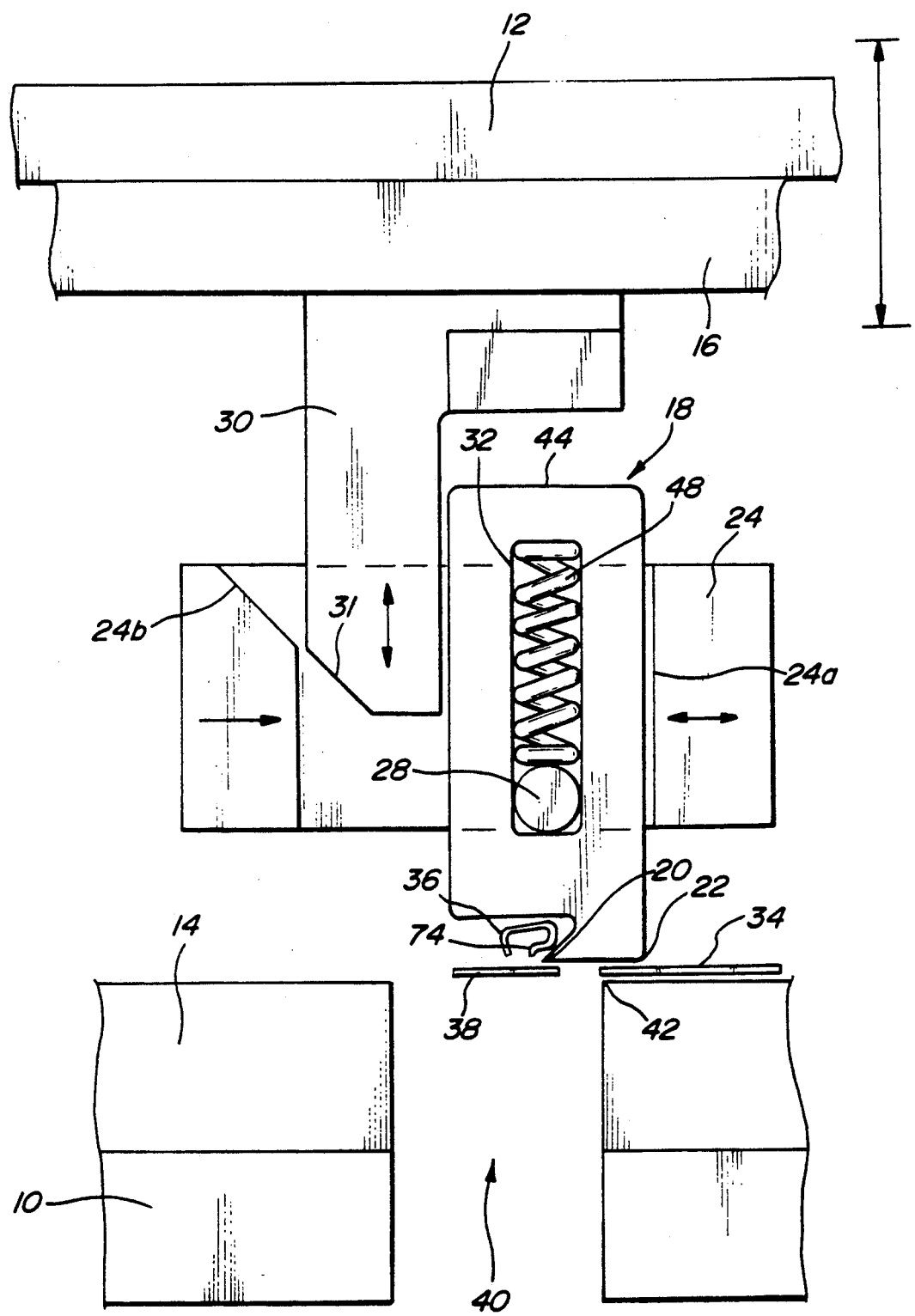
FIG. 4 is an end view of the die of the present invention showing the punch advanced tangential to the surface of the siding.
Figure 5:
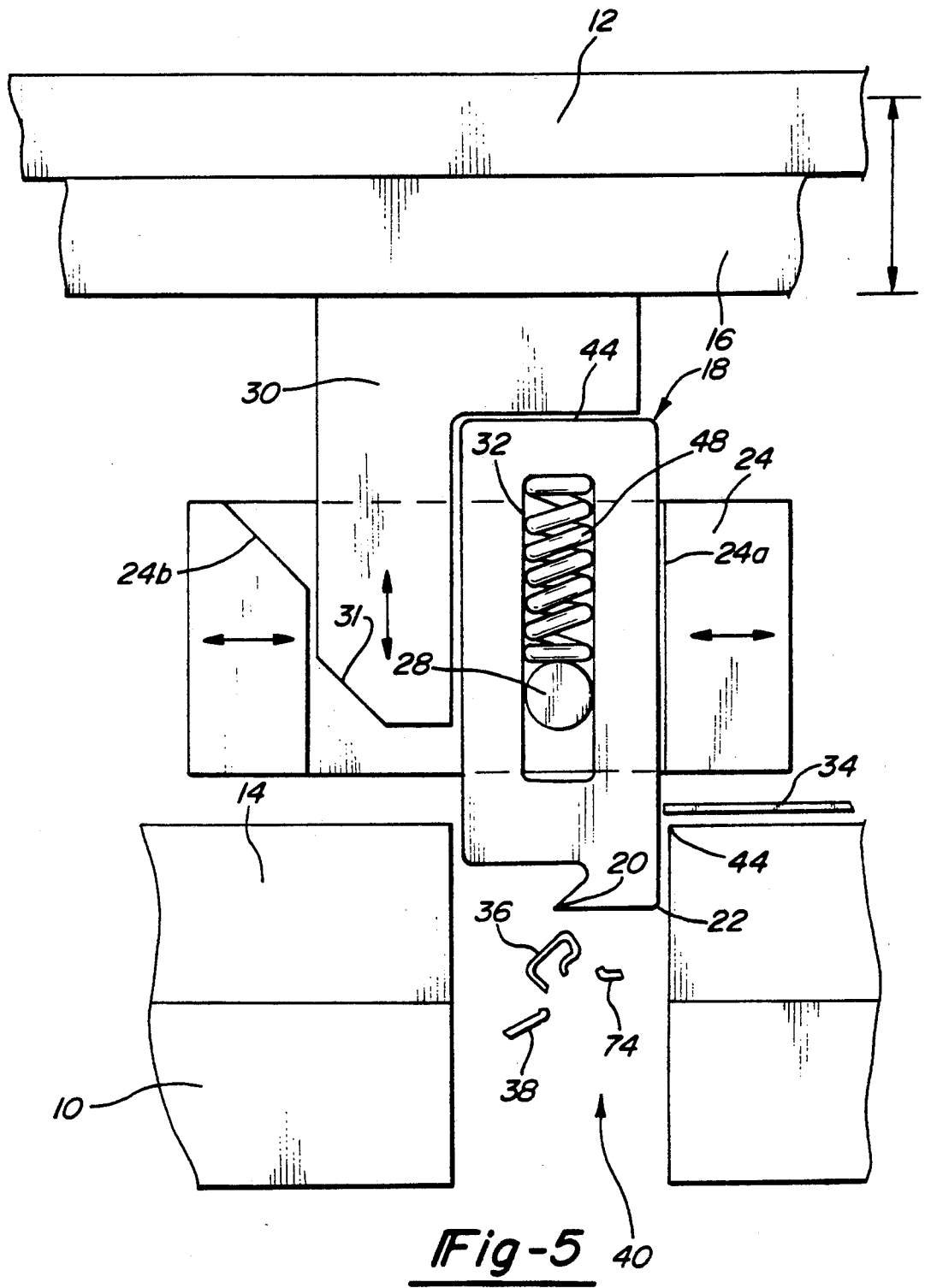
FIG. 5 is an end view of the die of the present invention showing the punch advanced orthogonal to the surface of the siding.
Figure 6:
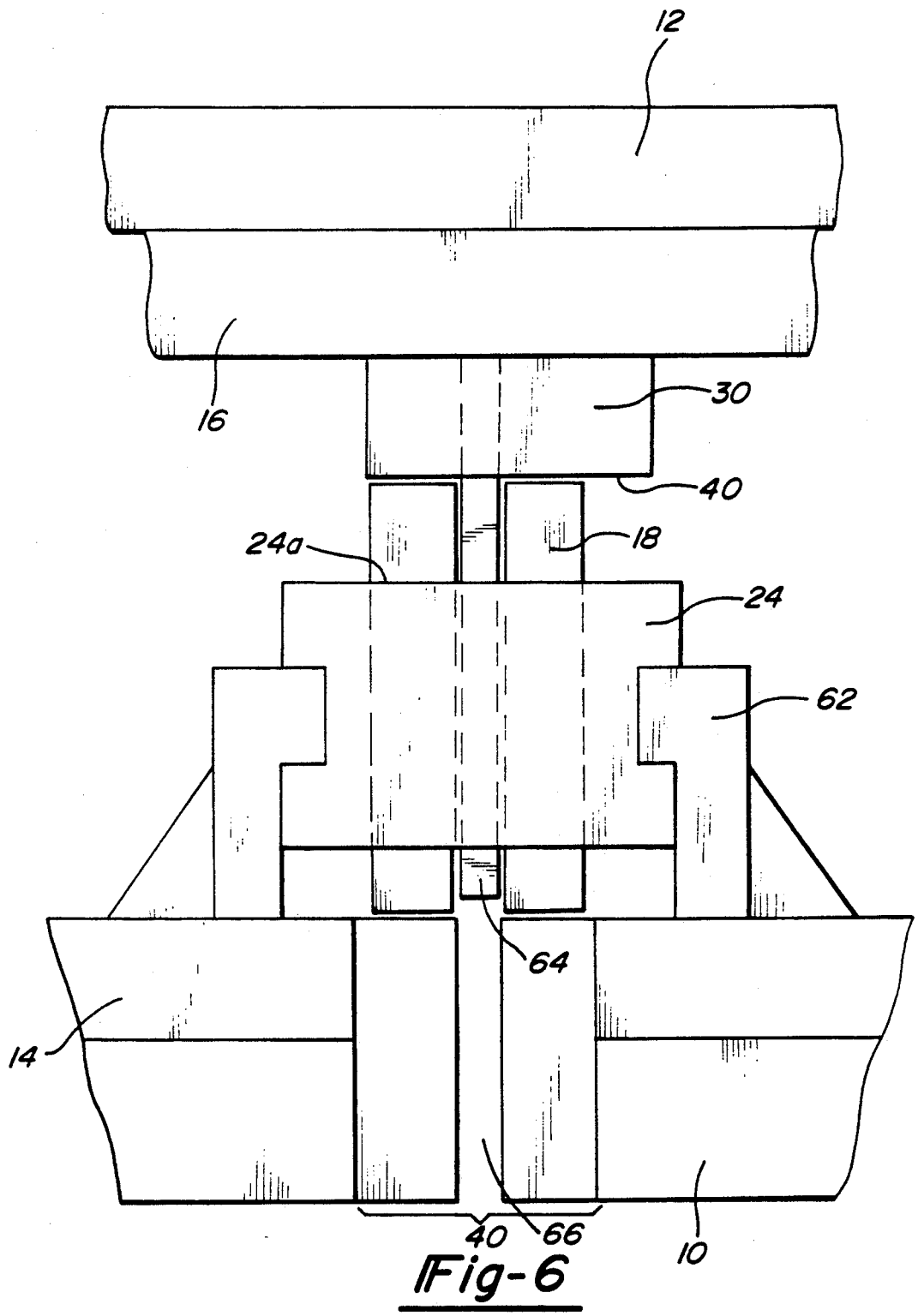
FIG. 6 is a side view showing the construction of the punch in relation to the cut off blade.
Figure 7:
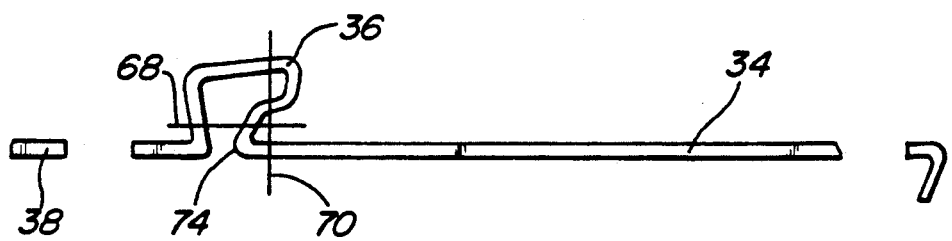
FIG. 7 is a cross-section view of siding member.
Figure 8:
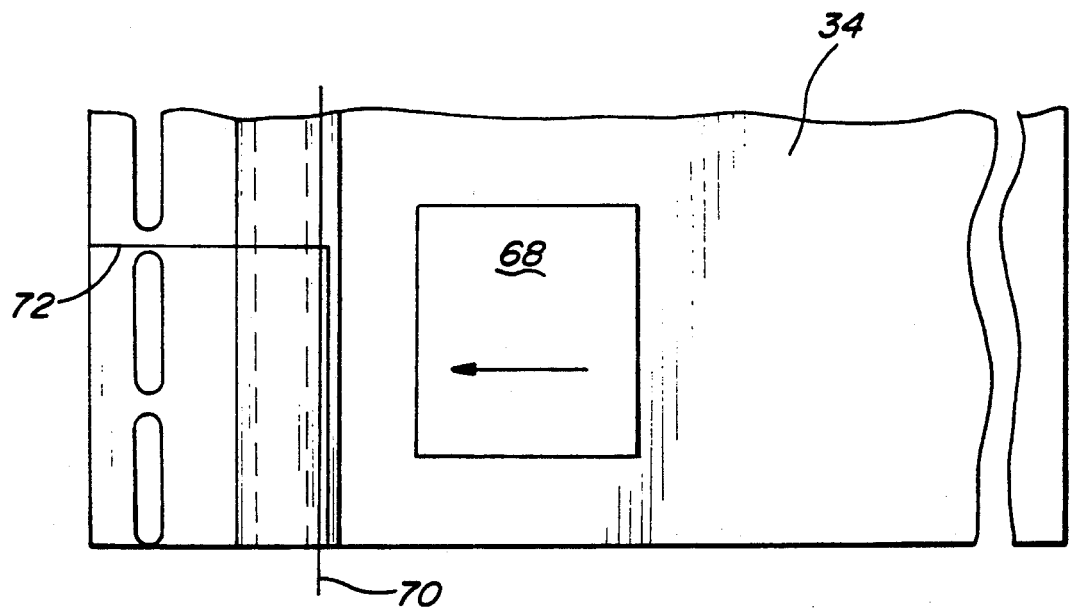
FIG. 8 is a top view of a siding member.

The preferred embodiment of the present invention as shown in FIGS. 1-6 includes a reciprocating press having a fixed platen 10 and a reciprocating platen 12 in which a die set is secured having a lower die 14 and an upper die 16. The lower die includes a punch 18 which may be moved horizontally as well as vertically. When punch 18 is moved horizontally, scarfing portion 20 cooperates with scarfing die 58 to accomplish a scarfing action. When punch 18 is moved vertically in cooperation with opening 40, a piercing action is accomplished. Such a range of motion is accomplished by reciprocating horizontal guide block 24 along reciprocating track 62 engaged with recesses 24C, 24C as best shown in FIG. 6. As shown in FIGS. 1, 4 and 5, block 24 is moved horizontally by engagement with reciprocating cam 30 having slide portion 31 which cooperates with slide portion 24B of block 24. In this manner the position of reciprocating platen 12 will correspond with a horizontally translated position of punch 18. As a result of horizontal translation, scarfing portion 20 of punch 18 will achieve scarfing of loop 36 along scarfing plane 68, as shown in FIG. 7. When the reciprocating cam 30 is advanced into contact with top portion 44 of punch 18 (as shown in FIG. 5), punch 18 will begin vertical translation and effects shearing of siding 34 along shear edge 42 of opening 40. In this manner, nailer 38 and edge portion 74 of siding 34 is pierced and thereby detached from the remaining portion of siding 34. At this point of travel, punch 18 is at the full extent of horizontal and vertical translation and will begin retracting upon retraction of reciprocating platen 12. During retraction, spring 48 in slot 32 will retract punch 18 thereby returning punch 18 to its original vertical position. In addition, spring 76 will provide a compliant force returning block 24 to its original horizontal position. FIG. 2 illustrates guide 56 having a relieved cross-section portion forming scarfing die 58 for receiving loop 36 formed in siding 34. Punch access 60 shown in FIG. 3 is provided in guide 56 and offers a clearance with punch 18 which is appropriate to effect a shearing action between cut-off blade 64 and the edge portions of punch access 60. It is to be noted that scarfing and piercing operations may be performed as a single continuous motion or in the alternative each operation may be performed independently. That is, by limiting the length of stroke of the reciprocating platen, to the limits shown in FIGS. 1 and 4 will provide a scarfing operation only. Alternatively, cycling the reciprocating platen between the limits depicted by FIGS. 4 and 5 will provide piercing operation only. Thus by controlling the stroke length, flexibility in function of the punch may be achieved.

An alternative embodiment as shown in FIGS. 9, 10, 11, and 12 includes a reciprocating press having a fixed platen 110 and reciprocating platen 112. Secured thereto is lower die 114 and upper die 116. Punch 118 includes scarfing portion 120 and shearing portion 122. Upright 124 fixed to lower die 114 facilitates pivoted motion of punch 118 about dowel 128. Reciprocating slide 130 includes a sliding portion 130A and displacing portion 130B for engagement with a respective portion of punch 118 upon reciprocation of platen 112. Slot 132 defines a path along which vertical displacement of punch 118 occurs. Spring 148 provides a compliant force urging punch 118 in a vertical direction. Siding member 134 includes loop portion 136 and nailer portion 138.

Figure 9:
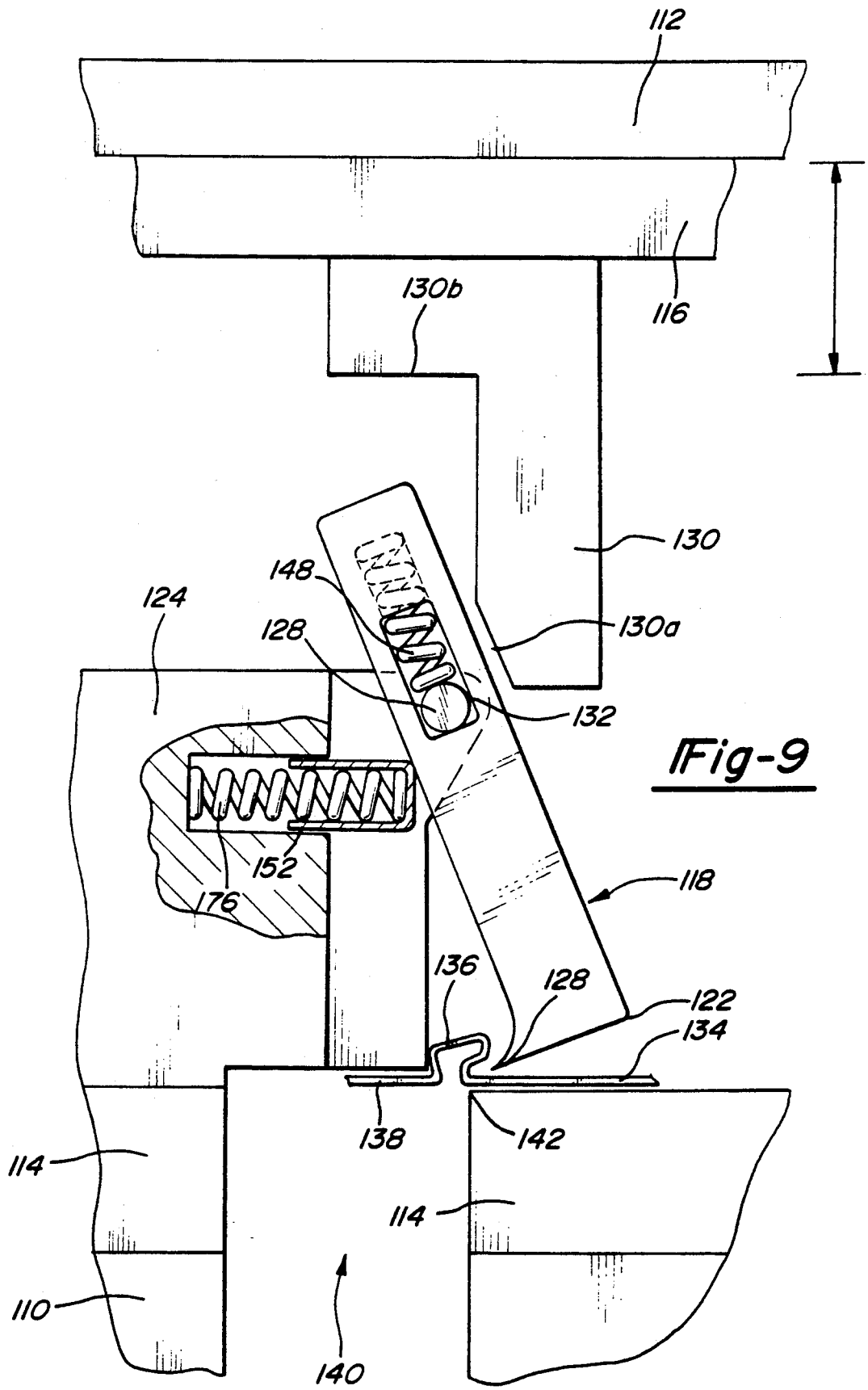
FIG. 9 is an end view of the die of the present invention showing the punch in retracted position.
Figure 10:
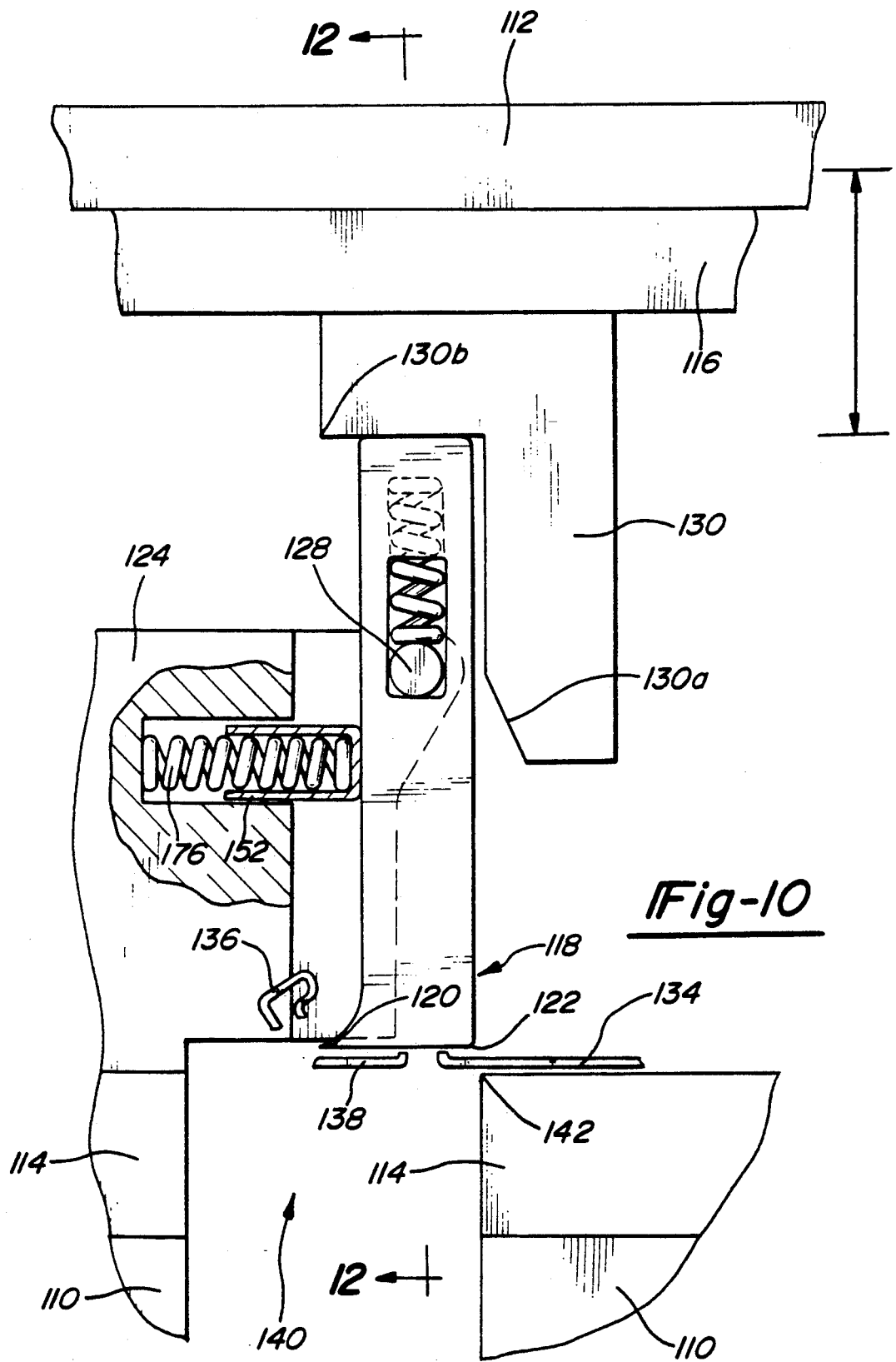
FIG. 10 is an end view of the die of the present invention showing the punch advanced tangential to the surface of the siding.
Figure 11:
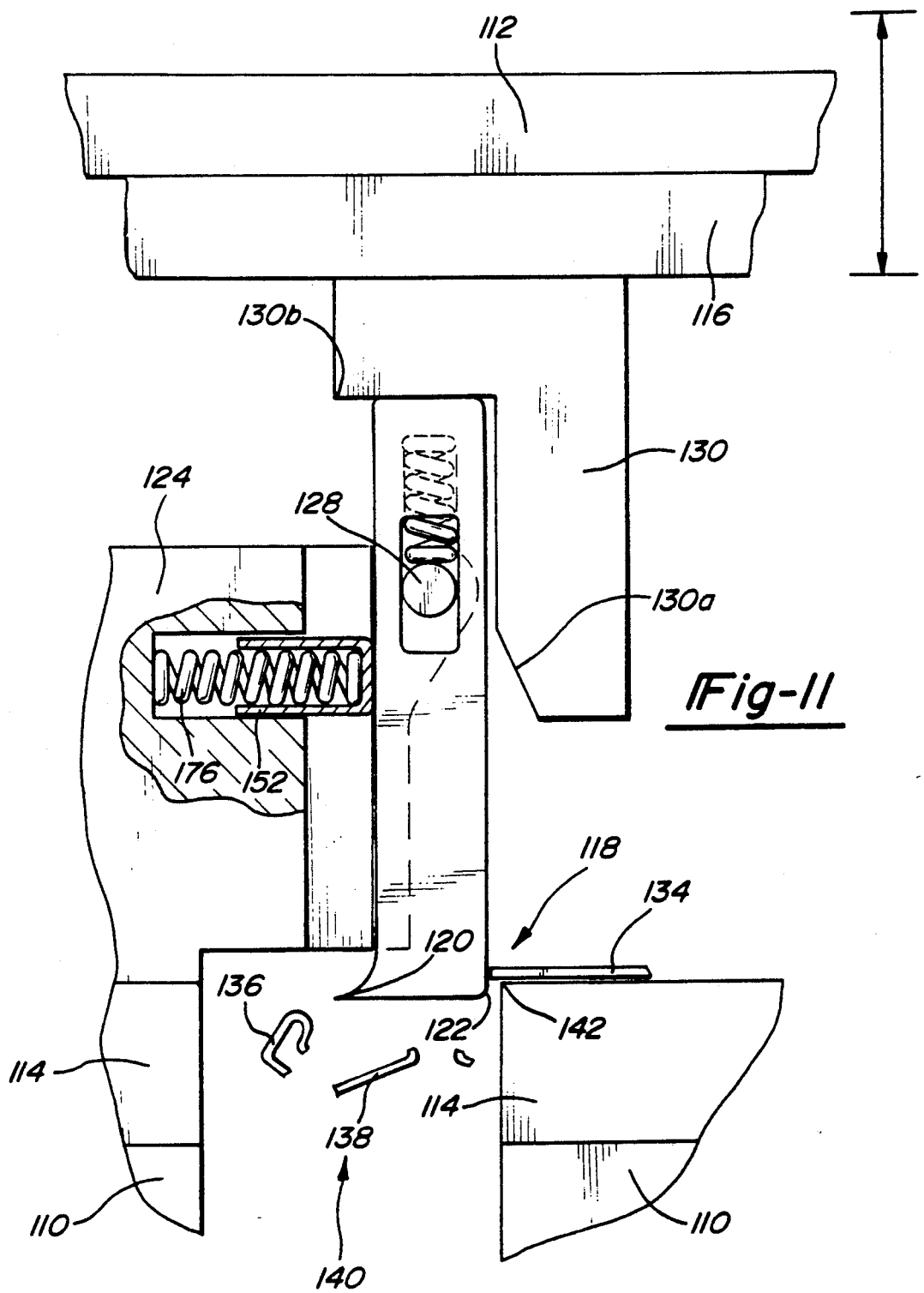
FIG. 11 is an end view of the die of the present invention showing the punch advanced orthogonal to the surface of the siding.
Figure 12:
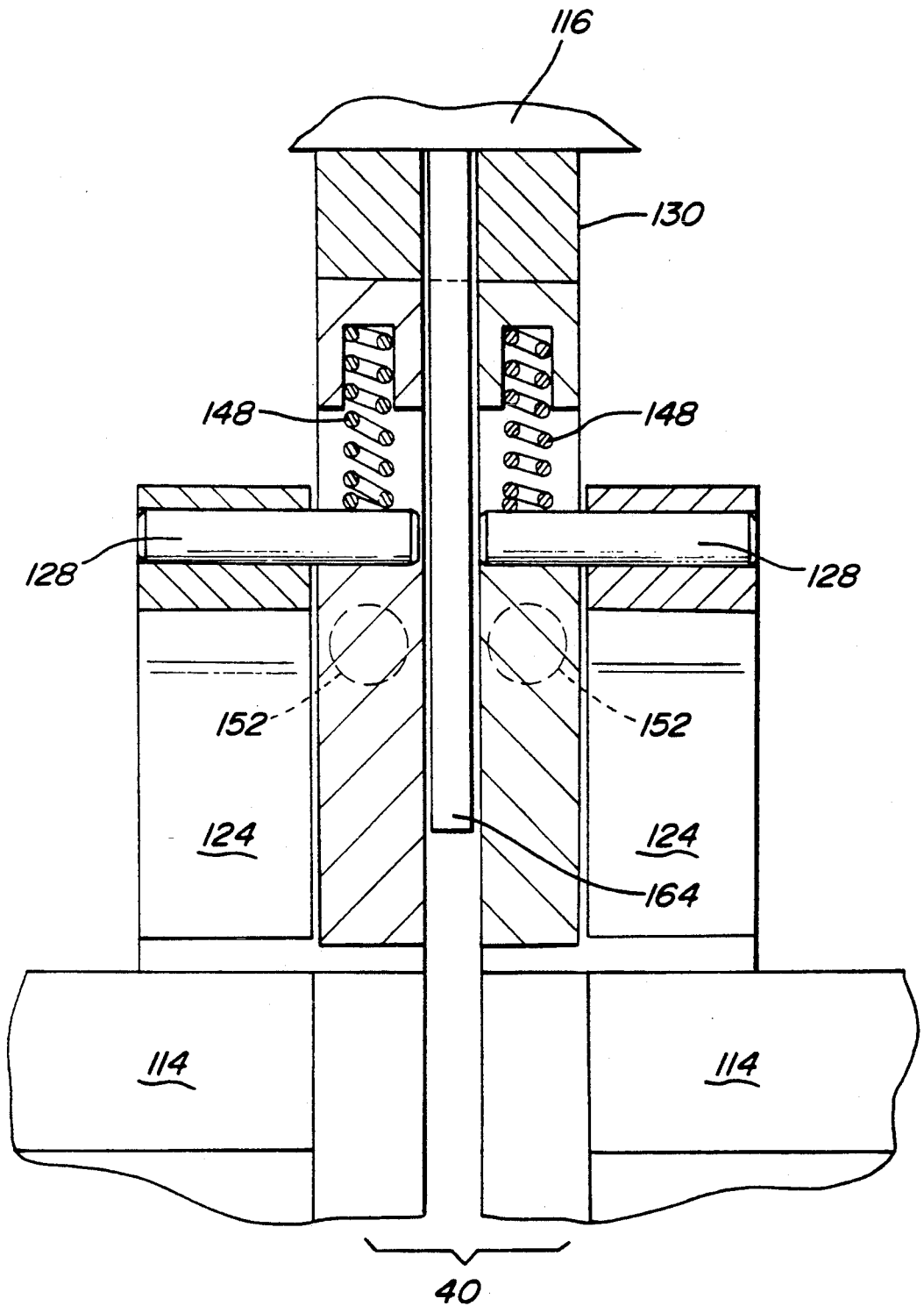
FIG. 12 is a side view showing the construction of the punch in relation to the cut off blade.

In operation, reciprocating platen 112 is advanced from initial position shown in FIG. 9 to that shown in FIG. 10, causing engagement of reciprocating slide 130 with punch 118 and thereby rotating scarfing portion 120 through an arc into and through loop 136 of siding 134. As reciprocating platen 112 advances farther, portion 130B engages the top surface of punch 118 (as shown in FIG. 11) causing vertical displacement thereof which results in piercing portion 122 of punch 118 passing through opening 140 and thereby shearing nailer 138 and edge portion of siding 174 along shear edge 142. In this manner scrap is deposited in opening 140. This completes the shearing operation at which point reciprocating platen 112 may be retracted. As the reciprocating slide 130 is retracted, spring 176 will maintain cap 152 in contact with punch 118 to cause punch 118 to return to an initial position. Upon full retraction of reciprocating platen 112, siding member 134 may be advanced forward to the preselected length as desired for subsequent notching. In conjunction with notching of siding, a cut off blade 164 (as shown in FIG. 12) may be reciprocated, causing shearing of siding 134 along lower die opening 154. In this manner siding may be cut to preselected lengths as determined by the portion thereof advanced between reciprocating cycles of the respective press.

It is to be noted that scarfing and piercing operations may be performed as a single continuous motion or that each operation may be performed independently. That is, limiting the length of stroke of the reciprocating platen, to that shown in FIGS. 9 and 10 will provide a scarfing operation only. Alternatively, cycling the reciprocating platen between the travel limits depicted by FIGS. 10 and 11 will provide piercing operation only. Thus by controlling the stroke length, flexibility in operation of the punch may be achieved.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A reciprocating die including lower and upper portions for a cutoff press for use in notching and cutting a length a member produced by a continuous forming operating comprising:

a punch disposed on said lower die having a first portion for piercing a first aperture in a first portion of said member upon motion of said punch relative to said member;

said punch having a second portion of piercing a second aperture in a second portion of said member upon motion of said punch in a second direction relative to said member;

said lower die defining first (40) and second (58) which cooperate with said first and second portions of said to piece said first and second apertures;

a reciprocating slide disposed on said upper die for engaging a portion of said punch to produce motion of said punch in a first direction;

said first opening of said lower die is connected to provide a conduit for conveyance of material removed from said members; and a cutoff blade disposed on said upper die and cooperating with an opening in said lower die which acts in conjunction with said punch to provide notching and cutting to length a member produced by a continuous forming operation.

2. A dual action punch for producing an aperture in a member having a planar portion and an extending portion extending from said planar portions comprising:

a first portion of said punch for piercing an opening in said extending portion as a result of motion of said punch in a direction substantially parallel to said planar portion;

a second portion of said punch for piercing and opening in said planar portion as a result of motion of said punch in a direction substantially orthogonal thereto;

said first portion of said punch for piercing an opening in said extending portion as a result of motion of said punch in a direction substantially parallel to said planar portion is accomplished by engagement of a sliding portion of said punch with a relatively reciprocating slide; and wherein said reciprocating slide produces motion of said punch along a path which is generally parallel to said planar portion along an arc.

3. The invention of claim 2 wherein said first portion of said punch for piercing an opening in said extending portion as a result of motion of said punch in a direction parallel to said planar portion is accomplished by engagement of a sliding portion of said punch with a reciprocating slide and said means for advancing said punch in a direction substantially orthogonal to said planar portion is accomplished by engagement of a driving portion of said punch with a reciprocating member.

* * * * *